United States Patent [19]

Porter et al.

[11] Patent Number: 5,171,611
[45] Date of Patent: Dec. 15, 1992

[54] METHOD OF SURFACE TREATMENT SURFACE TREATMENT OF VOID CONTAINING SUBSTRATE

[75] Inventors: Christopher S. Porter, Bromborough; John Powell, Wirral, both of England

[73] Assignee: Ravensworth Limited, London, England

[21] Appl. No.: 399,452

[22] PCT Filed: Feb. 23, 1988

[86] PCT No.: PCT/GB88/00117

§ 371 Date: Oct. 23, 1989

§ 102(e) Date: Oct. 23, 1989

[87] PCT Pub. No.: WO88/06200

PCT Pub. Date: Aug. 25, 1988

[30] Foreign Application Priority Data

Feb. 23, 1987 [GB] United Kingdom ............... 8704142

[51] Int. Cl.⁵ ...................................... B05D 7/02
[52] U.S. Cl. .............................. 427/245; 427/389.9; 427/246; 427/393.4
[58] Field of Search ............ 427/335, 384, 393.4, 427/245, 316, 323, 246, 381, 389.9

[56] References Cited

U.S. PATENT DOCUMENTS

| | | | |
|---|---|---|---|
| 3,546,004 | 12/1970 | Schachowskoy et al. | 427/246 |
| 3,628,997 | 12/1971 | Elkind | 427/393.4 |
| 3,767,462 | 10/1973 | Larrabee | 427/335 |
| 4,073,999 | 2/1978 | Bryan et al. | 427/376.2 |
| 4,414,280 | 11/1983 | Silva et al. | 427/245 |
| 4,743,470 | 5/1988 | Nachtkamp et al. | 427/246 |
| 4,834,747 | 5/1989 | Gogolewski | 427/245 |
| 4,894,157 | 1/1990 | Johnson | 427/245 |
| 4,985,280 | 1/1991 | Scholz et al. | 427/384 |

FOREIGN PATENT DOCUMENTS

| | | |
|---|---|---|
| 2632185 | 1/1977 | Fed. Rep. of Germany . |
| 981642 | 1/1965 | United Kingdom . |
| 1552942 | 9/1979 | United Kingdom . |
| 2040293A | 8/1980 | United Kingdom . |
| 2122630A | 1/1984 | United Kingdom . |

*Primary Examiner*—Michael Lusignan
*Assistant Examiner*—Diana L. Dudash
*Attorney, Agent, or Firm*—Patrick Michael Dwyer

[57] ABSTRACT

To a first organic liquid which has dissolved therein a flurocarbon polymer, e.g. 5 to 50% w/w e.g. PVDF, is added a second, compatible, non-solvent organic liquid in an amount (e.g. 1-50%) w/w such as to leave the polymer in solution. The mixed solution is applied to a leather or fabric substrate and heated e.g. at 60° C. to 150° C. for 2-15 minutes. Polymer deposits as the first liquid evaporates and pores form therein as the second liquid evaporates from the deposit. The anchored layer produced repels liquid water, but allows passage of water vapor.

17 Claims, 1 Drawing Sheet

METHOD OF SURFACE TREATMENT SURFACE TREATMENT OF VOID CONTAINING SUBSTRATE

BACKGROUND OF THE INVENTION

This invention relates to the treatment of substrates to prevent or at least greatly diminish the penetration into or through the substrate of liquid water while still permitting the passage into or through the substrate of water vapour.

The invention may be embodied as a method of treatment of the treated substrate itself, whether separate and capable of further fabrication into a final product or whether part of a permanent structure.

While the invention can be applied, for example, to the treatment of fabrics or the treatment of vapour-permeable layers such as natural or synthetic leather layers it can also therefore be applied to the treatment of a structural or decorative surface which needs to be permeable to water vapour while repelling or deterring the ingress of liquid water. In other words, the invention can be applied to the water-proofing of fabrics, to the surface treatment of leather, and to the surface treatment of walls, floors and ceilings to confer water repellency.

For ease of description the invention will be discussed primarily in terms of treatment of fabrics to confer water repellency.

It is well known to provide in apparel as a protective layer against rain, or against water droplets in the form of mist, an impermeable layer of polymer or the like. While suitable for short term wear, completely impermeable articles eventually generate considerable discomfort for the user, since the inevitable water vapour generated from the skin of the user cannot escape, accumulates at the inside of the impermeable layer and condenses. The garment becomes humid and uncomfortable to wear and becomes wet inside.

Because of this it is commonplace to treat fabrics to permit more or less passage of water vapour while preventing, or hindering, passage of water droplets. The water vapour molecule is many orders of magnitude smaller than a water droplet, and can pass through fine orifices which surface tension does not allow a water droplet to penetrate.

One known method of providing a "breathable" but water-repellent fabric is to utilize a fabric the threads of which expand upon contact with water. In normal use, the interstices between the weave are open enough to present no barrier to the passage of water vapour. If, however, the fabric is contacted with water the individual threads swell and tend to close off the gaps between them. There is still some facility for passing water vapour through such fabrics but the swollen moist fabric then prevents substantial transfer of water as liquid through from the outside to the inside.

There are, however, obvious disadvantages with such fabrics since they do become wet in use. Efficiency is not high, either for vapour transmission outwards or for the prevention of water travelling inwards.

A considerable improvement upon such materials can be obtained by conventional waterproofing, providing a water repellent coating for the fibres. This is the basis of the majority of waterproof materials, and involves treating the fabric in a solution of a water repellent polymer, typically a natural or synthetic rubber, so that a coating of such rubber is formed over each yarn or fibre. To some extent this has the effect of decreasing the size of the interstices between the fibres, but still leaving orifices through which water vapour can move inwards and outwards. However, the water repellent nature of the coating, defining the limits of these small interstices ensures that droplets of water do not penetrate the material (unless in extreme conditions). Water is therefore deflected while preserving the inside of the garment in a dry state. The differences between this and the foregoing proposal are that the threads themselves do not become wet and swollen, and that water is turned away from the fabric by the water-repellent coating on the threads.

A further improvement in fabric characteristics can be obtained by a process involving a different type of water-repellent polymer. If a film of polytetrafluoroethylene is produced e.g. by extrusion or casting, and thereafter stretched, it breaks up as an irregular network of fibrils while still retaining its essential nature as a sheet. Instead of stretching and tearing, it undergoes innumerable small fractures and cracks. It is known to take a sheet of such fibrillated or fractured film and to sandwich it between two layers of fabric, or possibly to adhere it only to a back of the fabric layer. Such a sandwich, or such a two-layer composition, is water repellent by virtue of the high water repellency of the PTFE. Water droplets, whether as rain or mist, are far too large to penetrate the small orifices between the fibrillated material, but of course these orifices, although small, present no barrier to the outward passage of water vapour molecules. Moreover, the fabric is free from any rubbery texture or smell, and the material has the advantage that it can be made up as a laminate from suitable reels of fabric and film, without the necessity for a dipping and curing process.

The present invention represents a new category of process for conferring water repellence upon a fabric while retaining vapour transmitting properties. It involves both the use of a water-repellent polymer, (such as a fluoropolymer) and the use of a dipping process, and gives a product where such polymer is present in a different physical state from anything envisaged or attainable by the prior art.

It is known in a totally different technical field to provide a non-stick coating upon for example a cooking utensil by sintering to the utensil PTFE powder previously applied as a suspension to the article and dried to a layer. It is also known, as an improvement or variant of this sintering process to provide a specialised curable paint vehicle containing particles of fluoropolymer with non-stick properties, and adhering this to a surface by curing the paint rather than by sintering the particles. In each instance, however, the objective is to obtain a good coating of material free from voids which can of course alter the non-stick properties and serve as sites for initiation of break up of the film. To this end, the surfaces to be treated are themselves typically quite smooth prior to application, so as to form a suitable basis for any provision of a non-stick sintered or cured layer.

SUMMARY

The present invention involves the treatment of fabric with particulate water-repellent polymer and the conversion of such particulate material into an adherent and coherent polymer layer by heat treatment, the polymer layer comprising a multiplicity of voids or orifices permitting the passage of water vapour and not permitting the passage of liquid water.

By contrast therefore, whereas the prior art was concerned with taking a prepared surface and providing thereupon a good integral layer free from voids, the present invention is concerned with taking an irregular substrate such as a fabric and providing in and upon the fibres of the fabric a coherent layer but of an "imperfect" i.e. perforate nature.

In one aspect the invention describes a fabric having supported thereon and disseminated throughout at least a surface thickness of the structure thereof a layer of water-repellent polymer including a multiplicity of orifices. A wide range of fabrics can be used; a close woven nylon fabric of 80-140 g.s.m. is a typical example.

The material of the present invention is to be distinguished from known materials in which a separate layer is attached to the fabric. While this layer is supported by the fabric, it is not disseminated throughout the structure but merely exists as a separate backing or sandwiched layer.

In another aspect the invention relates to garments, more especially garments having requirements of water repellency and vapour permeability, consisting at least in part of the fabric as defined above.

The invention also provides a layer of flexible porous material (such as artificial or natural leather) having at and within a surface thickness thereof a coherent but perforate layer of a water-repellent polymer.

The invention further envisages building structure the surface of which has coated thereupon a perforate layer of polymer material closely following the pores and irregularities of the surface whereby liquid water cannot penetrate into or through the wall but water vapour can pass outwards through the said layer.

In one aspect the invention consists in a method of providing a water-repellent but water-vapour-permeable coating over a void-containing substrate, comprising the steps of taking a solution of a fluoropolymer in a mixture comprising at least a first organic liquid which is solvent thereof and a second organic liquid non-solvent for the fluoropolymer and of lower volatility present in an amount such that no fluoropolymer is precipitated; applying the solution to at least one surface of the said substrate; and heating the substrate to drive off the mixture of liquids as vapour, whereby initial loss of first (solvent) organic liquids(s) as vapour causes fluoropolymer to deposit within the voids of the substrate and over the surface thereof and subsequent loss of second (non-solvent) organic liquid(s) as vapour causes at least in part formation of pores through the deposited surface layer.

The void-containing substrate may be solid structural or cladding material e.g. concrete, brick, plaster, masonary, chipboard, hardboard, paperboard, or composite board, having a porous nature such as to absorb liquid water into its surface and eventually transmit liquid water through its thickness. The discontinuities or voids may be inherent or imparted as part of the production process. Alternatively, the substrate can be a protective layer to furnishing or apparel, e.g. of natural or synthetic leather, or of a foamed polymer or rubber base, as used in upholstery, camping equipment, motorvehicles, boots, shoes, gloves etc. In particular it may be a fabric, either a heavy-duty canvas or sheeting material (e.g. for camping, military or transport use) or a lighter wearable fabric as used for rainproof or shower-proof garments.

The voids or discontinuities in such instances are the gaps between the warp and weft yarns (or in the knitted fabrics) and the gaps between individual fibres of which the yarns are composed.

Fabric coating is a major aspect of the invention, and a typical product comprises the original fabric within the various gaps or discontinuities of which is located a porous anchoring material of the fluoropolymer and upon at least one surface of which, integrally connected with the matrix, is a porous surface layer of the fluoropolymer. Usually, although not necessarily, the matrix has larger, ragged pores or interstices and a single surface layer is present as a clearly indentifiable separate layer with smaller through pores and/or interconnecting cells open to the inner and outer faces.

The fluoropolymer of the present invention are homopolymers or copolymers (including terpolymers and higher) containing a carbon chain backbone to the atoms of which are attached either fluorine or a fluorinated substituted group.

Hydrogen, or other halogen, substituents may also be present to minor extents. Fluoropolymers are well known in the chemical art, and examples include polytetrafluoroethylene (PTFE) polyhexafluoropropylene (PHFP), polyvinylidenefluoride (PVDF) and the like. Moreover, numerous fluoropolymers are sold under Trade Names such as TFB 7200, the less soluble TFB 7100 (both by Hoechst containing and TFE units, HFP units and VDF vinylidene fluoride units) KYNAR (PVDF by Pennwalt) and LUMIFLON (a fluoropolymer solution including vinyl ethers and produced by solution polymerisation by Asahi) and are distinguished by their properties rather than by a disclosure of detected chemical composition.

The first organic liquid(s) can be any which is solvent for the fluoropolymer or can indeed (as in the case of LUMIFLON) be the liquid solvent of the solution as purchased i.e. xylene. It should be of higher volatility than the second liquid i.e. lower boiling point. Typically low-boiling solvents which may be used include di-aliphatic ketones (especially those ketones wherein neither alkyl-group exceeds six carbon atoms, a preferred example being methyl isobutyl ketone, MIBK), di-aromatic ketones of similarly low molecular weights and boiling points, alkylaromatic ketones, or formamides such as dimethylformamide or pyrrolidones. The amounts of such solvents which may be used are variable depending on the starting polymer and other components, and properties desired for the coating. In general, the amount of polymer present in the solution with the first liquid, on a dry weight basis will range from say 5% to 50%, less being wasteful of solvent and of drying energy, and more giving difficulties in solution and application. More usually, from 15% to 30% of polymer is present relative to the total of the first liquid(s) and polymers.

The second, i.e. non-solvent, organic liquid(s) must be compatible with the first liquid(s), at least up to a reasonably high level of incorporation and must be less volatile e.g. have a higher boiling point. There appears to be two classes of such liquids particularly suitable for use, and especially when the first liquid is a ketone, namely (a) higher-boiling aliphatic or aromatic hydrocarbons, or mixtures thereof e.g. from $C_8$, or more especially $C_{12}$, and above or (b) hydroxy-substituted aliphatic hydrocarbons, possibly higher alcohols such as decanols, but more especially glycols such as ethylene glycol, and the lower liquid, polyethylene glycols e.g. up to PEG 400.

The amount of such second organic liquid(s) to be used is, in the practice of this invention, widely variable. It should not normally be so much as to precipitate the fluoropolymer before the mixture is contacted with the substrate. There should, however, be enough that the fluorocarbon will precipitate out as the coating is heated and that the vapour will at least assist in producing the necessary porosity at the surface. In general, from 1% to 50% w/w (of second liquid(s) to original solution) is used, more preferably 5% to 20%.

The man skilled in the chemical art will realise that more than one procedure is available for making up the initial solution in the mixture of liquids. The preferred procedure is to make up a solution in the said first liquid, and thereafter add the second liquid in an amount insufficient to bring about precipitation in the liquid phase.

In the practice of the invention it is preferred to heat the substrate to a temperature between 60° and 150°, and more usually between 75° and 120° C. Depending to some extent on the temperature and solvents used, from 2 to 15 minutes will generally suffice to drive off both liquids as vapour; enough time should be allowed for escape of the second, less volatile, liquid but the upper limit does not appear to be particularly sensitive. That is to say, the deposit, once formed, appears generally stable to further temperature exposure. In most instances from 3 to 10 minutes is adequate for drying off of solvents.

Another aspect of the invention consists in a fabric substrate carrying as a protective layer against passage of liquid water the integral combination of a porous anchoring matrix of fluoropolymer located between the filaments of, and within the gaps between, the fabric yarn and a porous surface layer over at least one surface. The invention extends to such fabric in the piece or made up as weatherproof articles whether of apparel e.g. raincoats, clocks, gloves, leggings or other use e.g. tents, covers of the like.

The mechanism of the process of the invention is not fully elucidated, and may indeed partake of different features with different starting materials and operating conditions. Thus, drying-off of the second liquid(s) may merely lead to precipitation of flurocarbon particles, which agglomerate with void-formation upon subsequent heating (i.e. rather as an imperfect sintered coating on a solid substrate). It seems more likely, however, that some gelation or softening of the precipitate is present, so that the agglomeration takes place before heating, and vapours are driven off and through the precipitated material to provide the necessary pores. Indeed, some formulations may tend towards uniform film-formation, all of the porosity being induced by vapour escape at different stages of coating formation. Thus, with fabric coating, it may be advantageous to at least partially seal off one face (e.g. on a process roller) during at least part of the heat treatment, to modify pore formation. However, any theory as to operation should not affect the scope of the claims appended hereto.

A particular embodiment of the invention is now described below by way of example only, and with reference to the single FIGURE of accompanying drawing showing a diagrammatic side view of coating equipment.

EXAMPLE 20 gms of the fluoropolymer TFB 7200, supplied by Hoechst Chemicals are dissolved in 80 gms of methyl iso-butyl ketone (MIBK) to give a theoretical solids content of 20%. Once completely dissolved by high speed mixing the solution is stored in a sealed container for 4 hours to allow for de-aeration.

This solution when free from air bubbles has a viscosity of 260 secs DIN 4 cup at 20° C.

To 20 gms of this solution between 0.5 and 2.0 gms (typically 1.0 gm) of liquid paraffin are carefully added with vigorous stirring to prevent premature precipitation of the TEB fluoropolymer. To this solution between 2.5 grms of monethylene glycol, is added, again with constant agitation. This solution is sealed, and stored for 4 hours prior to use, to enable de-aeration to take place. After this period, a typical viscosity would be 200 seconds DIN 4 at 20° C.

For laboratory purposes, a sample of a close woven nylon cloth of 120 g.s.m. is stretched between in a holding jig in the manner shown in FIG. 1. It is important that the cloth is free from grease and aerial contamination, and this is achieved if severe by a commercial "genklene" wash, followed by a thorough air purge using dry air at 10 psi pressure.

Depending on the cloth density, deposition of the wet film is by K-hand coater bars (RK Print-Coat Instruments Ltd., Royston, Herts) using the 100 $\mu$ bar No. 8. It is necessary to draw down an even coating onto the cloth to prevent the formation of air bubbles. The coated sample is immediately placed into an oven having an air temperature of 110° C., for 3 minutes.

The dry coating weight was 28 g.s.m. The pressure required to force water through the cloth was greater than 15 p.s.i. The evaporation loss through the film at 36° C. into an atmosphere at 18° C. and 30% humidity, over 24 hours was about 3000 g per sq. meter of fabric.

Figure 1:
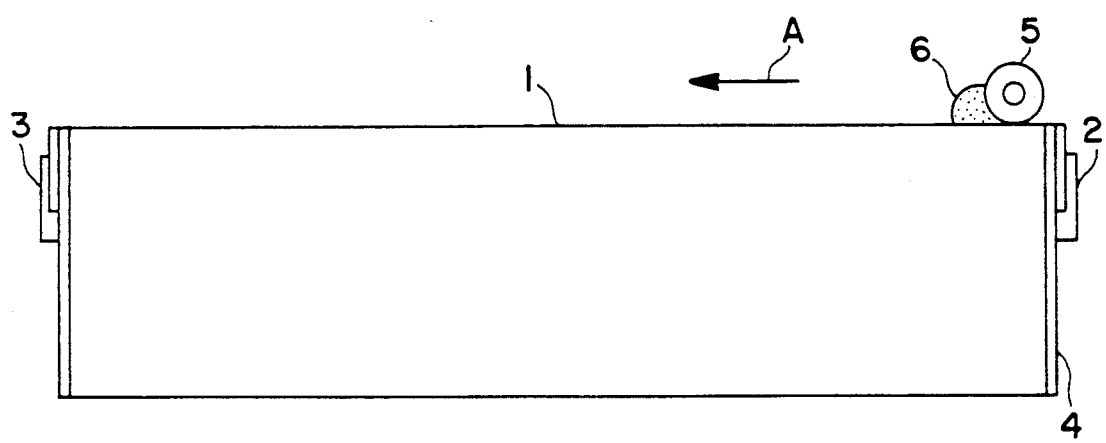
FIG. 1 shows a side view of suitable coating equipment is used for the above example. Fabric 1 is tensioned by clamps 2, 3 at the upper face of a holding jig 4. The K-coated bar 5 is drawn over the fabric surface in the direction of arrow A. The wet coating material 6 is thus spread uniformly over the fabric 1.

The above example can be modified and the component proportions which can be used, or characteristics achieved, can vary over a range of values. For example, from 0.5 to 5 g. of the glycol may be used, and the viscosity achieved can range from 150 to 300 seconds DIN 4 at 20° C. Fabrics of 80-140 g.s.m. weight have been coated, and an 80 $\mu$ coating bar has also been used. The oven temperature has been varied between 85° C. and 190° C., and the time residence from 30 seconds to 5 minutes. A useful range of dry coating weight is from 25 to 40 g.s.m. and the evaporation loss can range from 2800 to 4000 g/m$^2$/24 hours under the conditions specified above.

EXAMPLE 2

20 grms of fluoropolymer TFB 7200 supplied by Hoechst Chemicals are dissolved in 80 grams of methyl isobutyl ketone (MIBK) to give a theoretical solids content of 20%. Once completely dissolved by high speed mixing the solution is stored in a sealed container for 6 hours to allow for de-aeration.

This solution when free from air bubbles has a viscosity of 269 secs DIN4 cup at 20° C.

To 100 grms of this solution between 10 grms of mono ethylene glycol are carefully added with vigorous stirring.

For laboratory purposes a sample of a close woven nylon cloth of 100 gms/sq. meter is stretched in a holding jig in the manner shown in FIG. 1. It is important that the cloth is free from grease and aerial contamination.

Depending on cloth density deposition of the wet film is by K-hand coater bars, selecting the correct bar to give a dry coating weight of between 20 and 25 g.s.m. The coated sample is immediately placed in an oven at an air temperature of 80° C. for 5 minutes. At this coating weight the pressure required to force water through the cloth was 15 psi.

The evaporation rate through the film 24° C. into an atmosphere at 18° C. and between 50 and 60% relative humidity over 24 hours was of the order of 2500 g per sq. meter of fabric.

EXAMPLE 3

20 grms of PVDF (commercial name Kynar, supplied by Pennwalt Company Limited) was dissolved in 80 grms of dimethyl formamide and allowed to deaerate in the manner of Example 1.

To 100 grms of this solution between 8.5 grms of mono ethylene glycol was added with vigorous stirring. (Alternatively both dimethyl formamide and mono ethylene glycol can be pre-mixed and the PVDF solid slowly added again with vigorous stirring).

The cloth was then coated in a similar manner to Example 1 and immediately placed in an oven at an air temperature of 150° C. for 5 minutes. Cloth coated in this manner exhibited blow-through pressures of 20 psi whilst having an evaporation loss of 1500 grms/M$^2$/24 hours.

EXAMPLE 4

To 100 grms of the fluoropolymer "Lumiflon" solution supplied by ICI Mond Division, 8.5 grms of mono ethylene glycol was added again with vigorous stirring.

The resulting solution after de-aeration was applied to the cloth as for example in FIG. 1 and heat treated for between 5 minutes at an air temperature of 150° C. The coated sample exhibited a blow through pressure of 35 psi with a water evaporation rate of 800 gms/m$^2$/24 hours.

We claim:

1. A method of providing a water-repellant but water-vapour-permeable coating over a void-containing substrate, comprising the steps of taking a solution consisting essentially of a fluoropolymer in a mixture comprising at least a first organic liquid which is solvent thereof and a second organic liquid non-solvent for the fluoropolymer having a volatility lower than the first organic solvent liquid and present in a ratio to the solvent liquid such that no fluoropolymer is precipitated; applying the solution to at least one surface of the said substrate; and heating the substrate to drive off the mixture of liquids as vapour, whereby initial loss of solvent liquid as vapour causes fluoropolymer to deposit within the voids of the substrate and over the surface thereof and subsequent loss of non-solvent liquid as vapour causes at least in part formation of pores through the deposited surface layer.

2. A method as claimed in claim 1 in which the fluoropolymer is chosen from the group consisting of tetrafluoroethylene/hexafluoropropylene/vinylidenefluoride copolymer, a fluoropolymer solution including vinyl ethers produced by solution polymerization, and polyvinylidenefluoride polymer.

3. A method as claimed in claim 1 in which the first organic liquid is chosen from the group consisting of dialiphatic ketones, diaromatic ketones, alkylaromatic ketones, formamides and pyrrolidones.

4. A method as claimed in claim 3 in which the amount of polymer present in relation to the first liquid is from 5 to 50 percent by weight.

5. A method as claimed in claim 1 in which the second organic liquid is chosen from the group consisting of aliphatic and aromatic hydrocarbons having 8 to 12 carbon atoms or more, hydroxy-substituted aliphatic hydrocarbons such as decanols or higher, and glycols and polyethylene glycols.

6. A method as claimed in claim 1 in which the second organic liquid is present in a ratio of from 1 to 50 percent by weight of the solution of polymer in the first organic liquid.

7. A method as claimed in claim 1 further comprising the step of making up the liquid to be applied to the substrate by (a) dissolving the polymer in the first organic liquid and thereafter (b) adding the second organic liquid.

8. A method as claimed in claim 1 in which the substrate is heated to a temperature between 60° and 150° C. for a period between 2 and 15 minutes.

9. A method as claimed in claim 1 applied to a solid structural or cladding material.

10. A method as claimed in claim 1 applied to a protective leather or rubbery material.

11. A method as claimed in claim 1 applied to a fabric.

12. A method as claimed in claim 1 applied to a made-up garment.

13. A method as claimed in claim 4 applied to a solid structural or cladding material.

14. A method as claimed in claim 4 applied to a protective leather or rubbery material.

15. A method as claimed in claim 4 applied to a fabric.

16. A method as claimed in claim 4 applied to a madeup garment.

17. A method of providing a water-repellant but water-vapour-permeable coating over a void-containing substrate, comprising the steps of taking a solution consisting essentially of a fluoropolymer in a mixture comprising at least a first organic liquid which is solvent thereof and a second organic liquid non-solvent for the fluoropolymer having a volatility lower than the first organic solvent liquid and present in a ratio to the solvent liquid such that no fluoropolymer is precipitated; applying the solution to at least one surface of the said substrate; and heating the substrate to a temperature between 60° and 150° C. for a period between 2 and 15 minutes to drive off the mixture of liquids as vapour, whereby initial loss of solvent liquid as vapour causes fluoropolymer to deposit within the voids of the substrate and over the surface thereof and subsequent loss of non-solvent liquid as vapour causes at least in part formation of pores through the deposited surface layer.

* * * * *